United States Patent [19]

Cohen

[11] Patent Number: 4,564,862
[45] Date of Patent: Jan. 14, 1986

[54] GHOST SIGNAL ELIMINATION CIRCUIT

[76] Inventor: Edwin Cohen, 5 Crestmont Rd., Binghamton, N.Y. 13905

[21] Appl. No.: 406,331

[22] Filed: Aug. 9, 1982

[51] Int. Cl.$^4$ .......................... H04N 5/21; H04B 1/12
[52] U.S. Cl. .................................. 358/167; 358/905; 455/296
[58] Field of Search ............... 358/166, 167, 177, 905; 455/63, 222, 296, 302

[56] References Cited

U.S. PATENT DOCUMENTS

| | | | |
|---|---|---|---|
| 4,064,530 | 12/1977 | Kaiser | 358/167 |
| 4,240,106 | 12/1980 | Michael | 358/167 |
| 4,314,277 | 2/1982 | Prithard | 358/167 |
| 4,361,853 | 11/1982 | Remy | 358/167 |
| 4,413,282 | 11/1983 | Wargo | 358/167 |

OTHER PUBLICATIONS

A Digitalized Automatic Ghost Canceller, By J. Murakami, et al., IEEE Transaction on Consumer Electronics, vol. CE-23, Aug. 1979.

Primary Examiner—Tommy P. Chin
Attorney, Agent, or Firm—Douglas M. Clarkson

[57] ABSTRACT

A circuit is presented for eliminating a ghost signal from a television picture signal. A video amplifier amplifies the television picture signal which then is connected to an autocorrelator that will perform its mathematical functions of time delay, multiplication and integration to generate an output signal that is substantially free of ghost signals. A preferred form of the ghost signal elimination circuit includes microcomputer circuit means to perform the mathematical functions which permits use of standard, commercially-available autocorrelator circuits. Described also is way to package certain component parts including the autocorrelator to eliminate these undesirable signals from television sets already on the market.

1 Claim, 6 Drawing Figures

GHOST SIGNAL ELIMINATION CIRCUIT

BACKGROUND OF THE INVENTION

1. Field of the Invention

This invention, generally, relates to devices, apparatus and systems for the elimination of unwanted signals from a received, incoming signal and, more particularly, to a circuit for the elimination of unwanted, delayed and attenuated signals received as a part of television signals. In the television field, these unwanted signals are termed "ghosts" and are distracting as well as annoying. The circuit of the present invention is most effective in eliminating such unwanted ghost signals automatically.

The electromagnetic waves in particular ranges of frequencies used in television are easily reflected by buildings or terrain, and it is this characteristic that gives rise to multiple image reception, or "ghosts". These multiple images result in picture degradation and, in frequency modulated (FM) audio reception, causes distortion and loss of fidelity.

2. Description of the Prior Art

As used in television receivers, ghost suppression devices are well known. In such devices, part of a demodulated signal is both delayed and adjusted in polarity and amplitude to offset a ghost signal by adding back into the received television signal in order to "suppress" the ghost signal.

While this may be done manually, an example of an automatic circuit to accomplish such ghost suppression is illustrated in U.S. Pat. No. 4,128,848. Another example of an apparatus to cancel a ghost signal from an incoming video signal is described in U.S. Pat. No. 4,127,874. This apparatus uses a transversal filter to separate and, then, to cancel weighted signals.

In addition, it is well known to use highly directional antennas in order to make the reception of an unwanted, reflected television signal more difficult, thereby solving some of the problems of ghost images. However, in metropolitan areas, this is not very effective because signals reflected from the many high buildings sometimes are about as strong as signals received directly from the television transmitter, and such signals in these areas are received from many different directions.

Several of the more promising techniques used, or suggested, to reduce or to minimize "ghosts" in television picture reception were studied in exhaustive detail, and the results of the study are reviewed in an article entitled, "Performance Evaluations of Selected Automatic Deghosting Systems for Television", by Goyal, Armfield, Geller and Blank and published in the IEEE Transactions on Consumer Electronics, Volume CE-26, February, 1980. The results seem to indicate that, quite clearly, a performance/cost tradeoff will be required in order to obtain a practical deghosting system.

The above-mentioned most excellent work notwithstanding, the present invention provides a ghost signal elimination circuit that is substantially free of unwanted "ghost" signals, and the cost is minimal. There are literally millions of television receivers and FM receivers manufactured annually that need to be free from such unwanted signals. In addition, a ghost signal elimination circuit in accordance with the invention is adaptable to be manufactured separately as an independent article of manufacture for use in retrofitting the many receivers already in use.

SUMMARY OF THE INVENTION

It is an object of the present invention to provide a greatly improved device and circuit to eliminate ghost signals from a received, incoming signal.

It is an object also of the invention to accomplish the elimination of unwanted signals from a composite signal with hardware combinations not found in the prior art in order to perform this function more effectively and at a substantial saving in cost.

An unwanted signal elimination circuit constructed and arranged in accordance with the present invention is uniquely adapted to function most effectively in eliminating ghosts in a television system, but it will become apparent as the description unfolds that the circuit of the invention is adaptable readily to eliminate unwanted signals in other devices, such as radios.

In its presently preferrred embodiment, the circuit of the invention has an autocorrelator circuit which operates in conjunction with a microcomputer in order to function effectively. A composite, received signal is connected serially into a data shift register for comparison with a delayed signal that has been processed by the microcomputer.

The comparison is performed in an AND gate circuit such that an output is developed only when there is correlation between the portion of the composite signal that is wanted and the delayed and processed signal. A suitable data processor circuit is connected to generate the controls needed, as will be described presently.

DETAILED DESCRIPTION OF THE INVENTION

The same reference numbers are used hereinafter to identify the same or similar parts in the several figures of the drawings.

Figure 1:
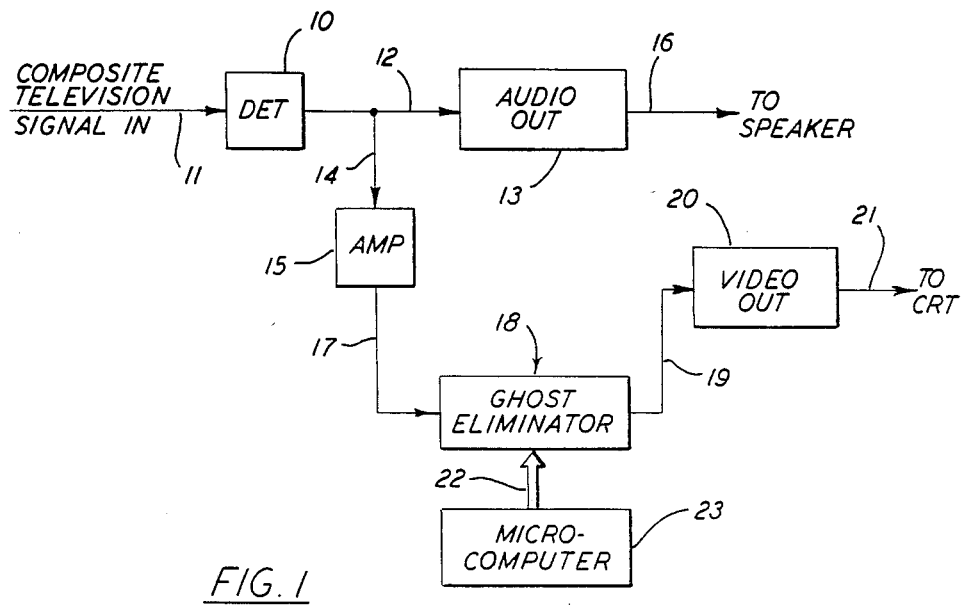
FIG. 1 is a block diagram of several basic component parts of a television circuit showing the interrelationship with the "ghost" elimination circuit of the invention.

Referring first to FIG. 1, a detector circuit 10 has an input terminal 11 to receive a composite television signal from, for example, a suitable television antenna. The output of the detector circuit 10 is divided between an audio output circuit 13, via a connection 12, and a video amplifier circuit 15, via a connection 14.

The audio output circuit 13 connects the output signal over a connection 16 to a suitable speaker (not shown). However, this part of a television circuit is not the part to be described now in connection with the present invention.

The ghost elimination circuit 18 of the invention is connected to the output of the amplifier circuit 15 by a connection 17 to receive both the wanted signal and the unwanted "ghost" signal, which is a replica of the wanted signal. The output of the ghost signal elimination circuit 18 is connected by a circuit 19 to the video output stage 20 of the television receiver. The video output stage 20 generates, in response to the signals input, the electrical drive necessary to form a picture on a Cathode Ray Tube (CRT) over a connection 21.

As an integral part of the ghost signal elinination circuit 18, a bus 22 permits cross communication with a microcomputer 23 in order to perform, at least once for each sweepline on the CRT, certain modifications to the composite signal received on the connection 17 so that the signal on the output circuit 19 is the pure, wanted signal only. The subtraction of the expected reflection component (the "ghost" signal) from the total signal is in a manner analogous to the workings of a noise cancelling microphone and will be described in more detail presently.

Now, one part of the present invention involves a mathematical process called "correlation", which measures the similarity between two signals. This measurement of similarity between two signals $v_1(t)$ and $v_2(t)$ is expressed mathematically as follows:

$$C_{1,2} = \frac{1}{T_o} \int_{-T_o/2}^{+T_o/2} v_1(t) \cdot v_2(t + D) dt \quad (1)$$

where:

$C_{1,2}$ is the correlation between the two signals 1 and 2;

D is the amount of time shift between signals 1 and 2; and $T_o$ is the period of the signals.

The above equation (1) expresses the amount of correlation between the two signals $v_1$ and $v_2$ and shows it as a function of a delay D. The correlation C is completed by integrating the relationship over the range of the period of the signals.

The term "autocorrelation" is meant simply that the function $v_2(t)$ is a time delayed replica of $v_1(t)$, as is the case in much of what has become known in television as "ghost" images.

Figure 2:
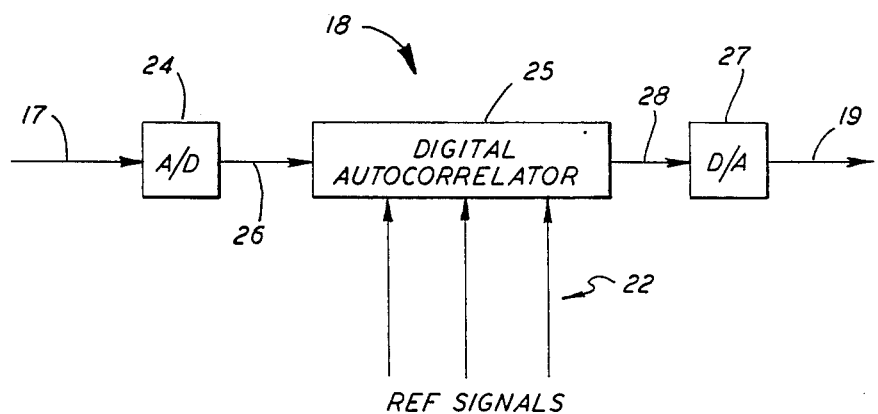
FIG. 2 shows in block form, some of the parts of the "ghost" signal elimination circuit of the present invention.

Referring now to FIG. 2 of the drawings, the composite signals on the connection 17 go, first, to an Analog-to-Digital converter, identified by the reference numeral 24, which changes them into discrete form with the time scale and amplitude are quantized into discrete steps. Then, the discrete form of the composit signals is connected to a digital autocorrelator 25 over a line 26. The autocorrelator 25 compares, bit by bit, one sequence of binary digits with another in order to identify the periodicities within the composite signal stream.

Those signals that exhibit high autocorrelation levels only are connected to a Digital-to-Analog converter 27 over a line 28. These signals, therefore, will be in a "pure" form of the wanted signal, and it will be explained in more detail exactly how they are developed presently.

In an n-bit code example, the autocorrelator 25 is set to compare "n" consecutive bits on the incoming line 26 sequentially with corresponding, first-received, n-bits of "correct" signal. If a high correlation is obtained, the correct signal, representing the wanted portion of the input, composite signal on the line 26, is connected to the line 28. On the other hand, if the correlation is low, another pass through the registers of the autocorrelator 25 will be made in an automatic effort to correct the low correlation. However, if this ssecond pass through also fails to develop a high correlation, the second-received signal is blocked, and the first-received signal is connected to the output line 28.

Other forms of digital "ghost" signal cancelling circuits have been proposed in the past, but at best, they are complicated and involve so much hardware that the cost is excessive. One such proposal involves a multi-tap digital transversal filter, which in turn requires tap gain control circuits, waveform mode controllers, signal routing control circuits, cascaded stages of pyramidal summing networks, complicated signal processors to produce data for tap gain correction, etc., etc.

In contrast with the prior proposals, an arragement according to the present invention can be incorporated into a single chip containing both digital and analog elements. This, when used in conjunction with a commercially-available autocorrelator such as the 24-pin TDC1023J from TRW LSI Products, Inc., a highly effective ghost signal eliminator is formed.

Figure 3:
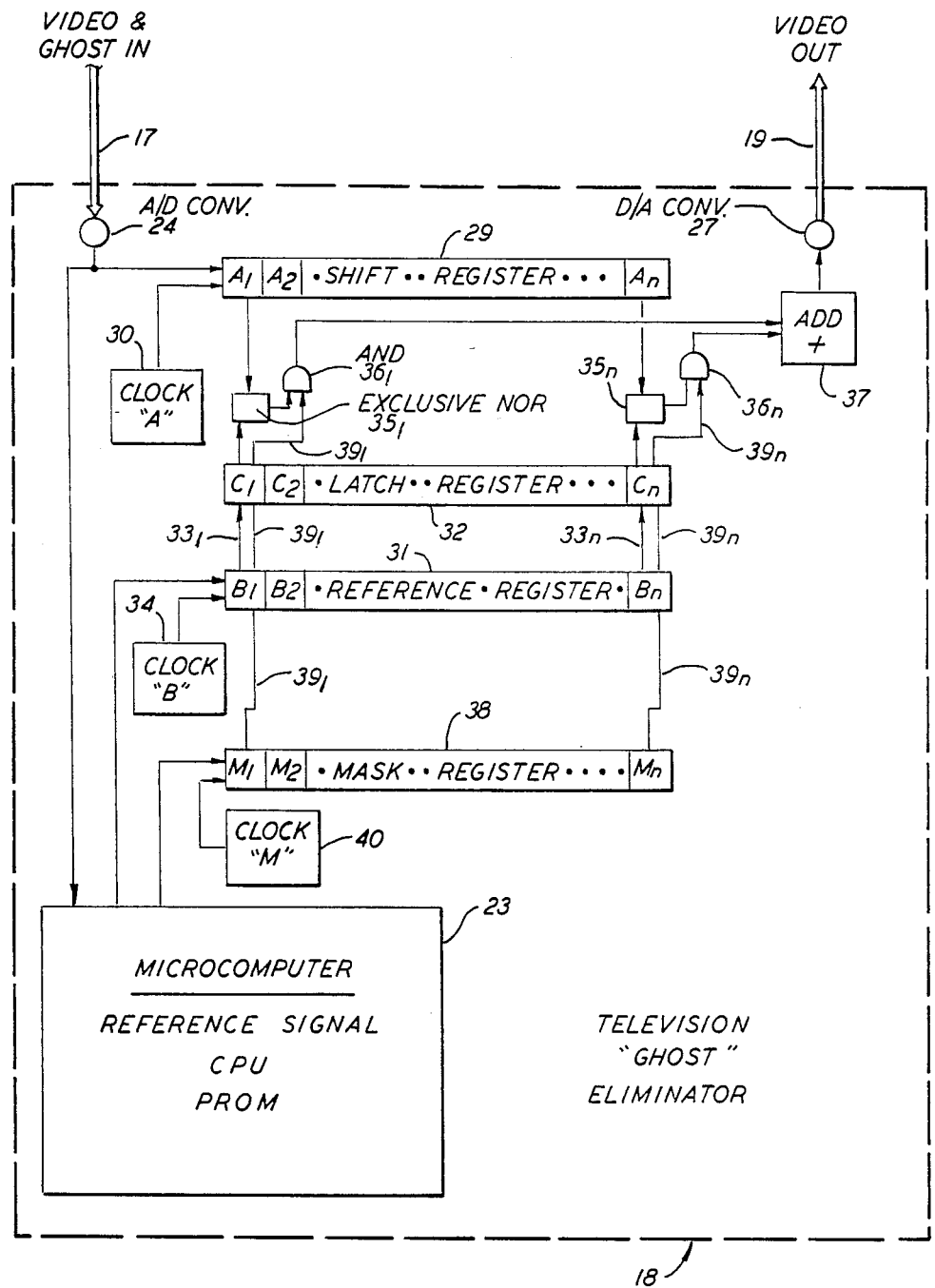
FIG. 3 shows, for the purposes of the more detailed description to follow, many of the important features of the present invention.

However, proceeding with a more detailed description of the present invention, reference is made more particularly to FIG. 3 of the drawings. The composite signal containing both wanted and the replica or unwanted signals is connected over the connection 17, as explained previously.

After conversion to a desired or a predetermined digital form in the analog-to-digital converter 24, the input signal is shifted serially into the microcomputer 23 and into a "n" position shift register 29. The shift register 29 is clocked with a separate clock 30, also identified with the letter "A".

The microcomputer 23 determines the weighted average of the input signals, time delaying more recent like signals more than less recent signals and shifts these into a reference register 31. An algorithm, such as equation (1) identified above, is maintained in a PROM portion of the microcomputer 23 for this averaging and time delaying functions of the microcomputer 23.

While almost any number of data locations may be selected for the "n" bit registers, an especially desirable number is 256 bits because that is the usual number of individual picture elements (called "pixels") along each scanline of a television raster. Alternatively, a 64 bit register can be used coupled with a path to recirculate the signal four (4) times, for each scanline, because $4 \times 64 = 256$.

The thus-processed signal (processed by the microcomputer 23) now in the reference register 31 is copied into a latch register 32 over a series of connections $33_1 \ldots 33_n$ at a clock rate determined by a separate clock 34, identified also with the letter "B". The latch register 32 can also be identified as a "C" latch, because of its individual data storage positions $C_1, C_2 \ldots C_n$. While correlation is being performed between data bits in the shift register 29 and the latch register 32, another signal can be shifted serially into the reference register 31.

The data in each position of the shift register 29 is compared continuously with data in corresponding positions in the latch register 32 by respective EXCLUSIVE NOR gates $35_1 \ldots 35_n$, the respective outputs of which are connected to an ADD circuit 37 through individual AND gates $36_1 \ldots 36_n$. The output of the digital ADD circuit 37 is in binary form, representing the number of bit positions in the shift register 29 and the latch register 32 that are in agreement at a given instant of time.

The output of the digital ADD circuit 37, therefore, will be a digital representation of the true wanted signal, and this output is connected directly to a digital-to-analog converter 27. The digital-to-analog converter 27, in turn, is connected to the line 19 leading to the video output circuit 20, FIG. 1.

All of the principal functions of an autocorrelation circuit that is connected in accordance with the invention are illustrated in FIG. 3 of the drawings. The microcomputer 23 processes the incoming composite signal as predetermined by the mathematical relationship stored in the PROM portion of the microcomputer 23, in the instance of the invention it is the equation (1), indentified hereinabove.

Then, the output of the microcomputer 23 is shifted into the reference register 31, and from there, it is shifted into the latch register 32 which, like the shift register 29, is "n" bits long, where "n" is a whole number, preferrably 256. The respective bits of the two registers, the shift register 29 and the latch register 32, are connected to respective EXCLUSIVE NOR gates $35_1 \ldots 35_n$ whose individual outputs are summed in the ADD circuit 37 to give a pure, wanted signal.

Therefore, the output of the autocorrelation circuit 18 is obtained by aligning the input composite signal in the shift register 29 relative to a signal in the latch register 32 that has been processed in accordance with the mathematical relationship as expressed by equation (1). The ADD circuit 37, the registers 29 and 32 and the EXCLUSIVE NOR gates $35_1 \ldots 35_n$ fulfill the three functions of autocorrelation, i.e., time delay, multiplication and integration, respectively.

The output of each respective EXCLUSIVE NOR gate $35_1 \ldots 35_n$ is connected, as explained previously hereinabove, as one of the inputs to respective ones of AND gates $36_1 \ldots 36_n$, the other input being from a mask register 38, such as, for example, the connection $39_1$ from the output of bit $M_1$ of the mask register 38, running past the bit $B_1$ of register 31, past the bit $C_1$ of the register 32 to be connected as the second input to the AND gate $36_1$.

Having the mask register 38 permits another dimension of effectiveness for a ghost signal elimination circuit constructed and arranged according to the invention. The mask register 38 permits the selection of bit positions where no comparison is to be made. The mask register 38 is clocked separately by a clock 40, identified also by the letter "M" in FIG. 3.

The mask register operates in the following manner to accomplish its "masking" function. A signal from the microcomputer 23 is shifted into the mask register 38, with a preselected logic value in the position where no comparison is to take place. In this way, the preselected AND gate 36 will be inhibited from passing the output of its respective EXCLUSIVE NOR gate 35. Such outputs are "masked", or prevented, from reaching the ADD circuit 37.

In accordance with the invention, the autocorrelator compares, bit-by-bit, one sequence of binary signals, or digits, against another. Since such autocorrelation is the comparision of one set of signals, or digits, against itself but delayed in time, the problem of the ghost signals is reduced to an identification of periodicities within the stream of signal digits. The autocorrelator connected and arranged according to the invention will even extract the wanted signal from a random noise background, because such a wanted signal has a high autocorrelation level, while the random noise does not.

Usually, autocorrelation involves comparing a given signal pattern with a "standard" or a "correct" signal pattern. However, in accordance with the present invention, the autocorrelator in a ghost signal elimination circuit, particularly for television sets, as described hereinabove generates its own "standard" or "correct" signal pattern, connected to operate as described hereinabove.

As described hereinabove, the process of autocorrelation is concerned with the mathematical processes of multiplication, a time delay and integration. The effects of these is illustrated in FIG. 4 of the drawings, which shows two waveforms that have similar, in this instance the same, shape and equal periodicity.

Figure 4:
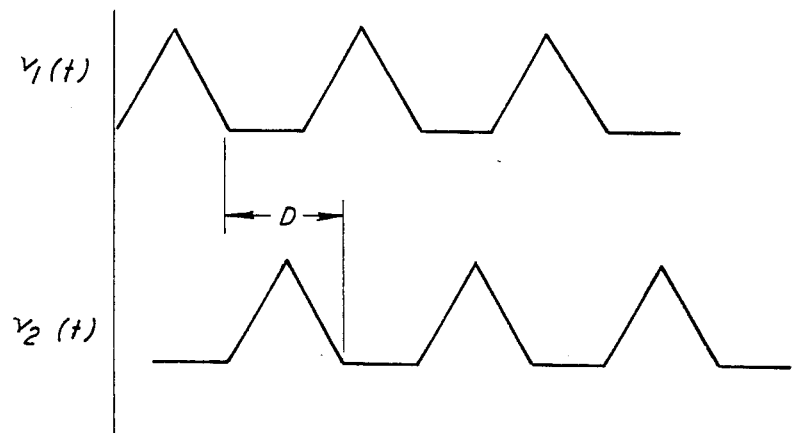
FIG. 4 shows two waveforms that have similar shapes and equal periodicity, delayed in time, for the purpose of explaining the operating principles of the invention.

As seen in FIG. 4, the particular time shift between the signals $v_1(t)$ and $v_2(t+D)$ is shown as being the value $D_{max}$. In this example, the value of $D_{max}$ is selected to illustrate a very low correlation between the two signals $v_1(t)$ and $v_2(t+D)$, actually the value of $D_{max}$ shown in FIG. 4 is such that the product of the two signals is equal to zero (0).

In contrast with the above, the amount of time shift between the two signals $v_1$ and $v_2$ which would maximize the degree of overlap would also give a maximum correlation. Accordingly, as the illustration in this figure shows, the correlation of the two signals is sensitive to their relative phase relationship.

Figure 5:
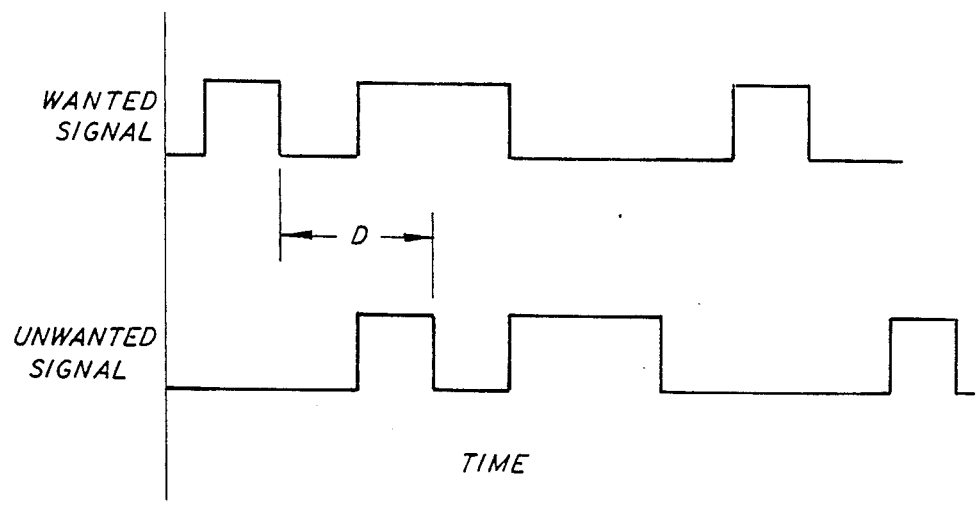
FIG. 5 shows two waveforms with a particular time delay between them, for use hereinafter in explaining the inventive principles.

Referring now to FIG. 5 of the drawings, two signals are shown after they have gone through the analog-to-digital converter 24. The unwanted signal is a ghost of the wanted signal, the first being the reflected signal and the second being the more direct signal. Nevertheless, the two signals are the same shape, only the reflected, or unwanted, signal is delayed in time.

In accordance with the present invention, the autocorrelator 18, FIG. 3, will measure the amount of the time delay, D, between the wanted and the unwanted signals, and then, it eliminates this delay by shifting one signal relative to the other. The maximum correlation occurrs when the total shift just matches the amount of time delay, D.

Figure 6:
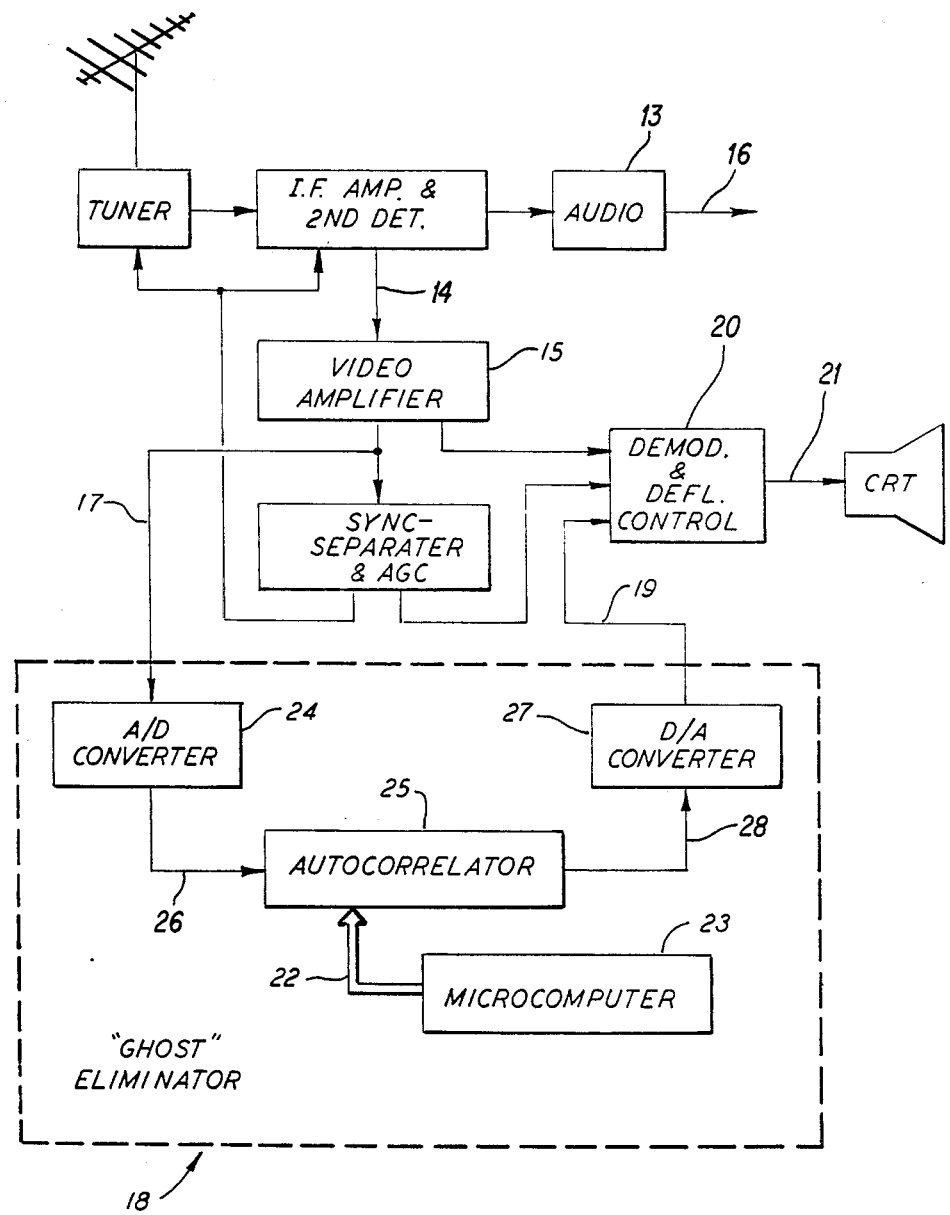
FIG. 6 shows, in block form, component parts of an article of manufacture in accordance with one aspect of the invention.

FIG. 6 of the drawings shows several comonents of the circuit of the invention collected and arranged together so that it can be illustrated how the many television sets already on the market can readily be retrofitted with a product that is manufactured in accordance with the inventive concept. Although it is stated earlier hereinabove that the same reference numerals are used to identify the same or similar component parts in the several figures of the drawings and in this detailed description, the view in FIG. 6 is patterned after the view in FIG. 1 but with sufficiently more detail so that it is seen how a ghost signal elimination circuit that is manufactured in accordance with the invention can be fitted readily into a standard television system.

However, FIG. 6 shows more details of a standard television system, but the various blocks in this figure contain much more detailed legends, and therefore, further explaination is believed to be unnecessary since their respective functions are so well known. As was described in detail hereinabove referring to FIG. 1 of the drawings, the ghost signal elimination circuit of the invention is connected to receive its input from the video amplifier circuit 15 (FIG. 1), and the connection 17 performs this function.

Similarly, the output of the ghost signal elimination circuit 18 is provided by the circuit 19. The analog-to-digital converter 24 and the digital-to-analog converter 27, as well as the autocorrelator 25 with the microcomputer 23, have been described in detail hereinabove, and their respective functions in this manufactured product all are the same as when the circuit of the invention is built in at the factory when the television sets are made.

The scope of the invention is defined by the appended claims.

I claim:

1. A ghost signal elimination circuit for eliminating an unwanted signal from a composite signal in which the unwanted signal is a replica of a wanted signal but is shifted in time from the wanted signal, comprising:

circuit means to receive said composite signal including the wanted signal and the unwanted replica signal;

autocorrelater circuit means connected to said circuit means to receive said wanted signal and said unwanted replica signal to compare the unwanted replica signal with the wanted signal according to the mathematical relationship:

$$C_{1,2} = \frac{1}{T_o} \int_{-T_o/2}^{+T_o/2} v_1(t) \cdot v_2(t + D) dt$$

where:

$C_{1,2}$ is the correlation between the wanted signal and the unwanted signal,

D is the time shift between the two signals, $T_o$ is the period of the two signals, $v_1$ is the magnitude of the wanted signal, $v_2$ is the magnitude of the unwanted signal;

said autocorrelator circuit means including means to perform the functions of time delay, multiplication and integration on said wanted signal and said unwanted signal, respectively, to generate a single output signal corresponding to said wanted signal, and means connected to said autocorrelator circuit means for receiving said output signal for use with said ghost signal substantially eliminated.

* * * * *